(12) United States Patent
Kuno et al.

(10) Patent No.: US 7,637,565 B2
(45) Date of Patent: Dec. 29, 2009

(54) VEHICLE SEAT WITH MONITOR

(75) Inventors: Satoru Kuno, Aichi (JP); Yuichi Harada, Aichi (JP); Tsunetoshi Hattori, Aichi (JP)

(73) Assignee: Toyota Boshoku Kabushiki Kaisha, Aichi (JP)

( * ) Notice: Subject to any disclaimer, the term of this patent is extended or adjusted under 35 U.S.C. 154(b) by 309 days.

(21) Appl. No.: 11/909,834

(22) PCT Filed: Feb. 20, 2007

(86) PCT No.: PCT/JP2007/053110
§ 371 (c)(1),
(2), (4) Date: Sep. 27, 2007

(87) PCT Pub. No.: WO2007/108271
PCT Pub. Date: Sep. 27, 2007

(65) Prior Publication Data
US 2009/0261638 A1    Oct. 22, 2009

(30) Foreign Application Priority Data
Mar. 16, 2006    (JP)    ................ 2006-072397

(51) Int. Cl.
*A47C 7/72*    (2006.01)
(52) U.S. Cl. .................. 297/217.3; 297/188.05; 297/408
(58) Field of Classification Search .......... 297/217.3, 297/408, 188.04, 188.05; 348/837, 843
See application file for complete search history.

(56) References Cited

U.S. PATENT DOCUMENTS

| | | | |
|---|---|---|---|
| 6,669,285 B1 * | 12/2003 | Park et al. ................ 297/217.3 |
| 6,698,832 B2 | 3/2004 | Boudinot | |
| 6,739,654 B1 * | 5/2004 | Shen et al. ................ 297/217.3 |
| 7,044,546 B2 * | 5/2006 | Chang ...................... 297/217.3 |
| 7,070,237 B2 * | 7/2006 | Rochel ..................... 297/217.3 |
| 2003/0025367 A1 | 2/2003 | Boudinot | |
| 2005/0099042 A1 | 5/2005 | Vitito | |
| 2008/0203788 A1 * | 8/2008 | Hattori et al. ............ 297/217.3 |

FOREIGN PATENT DOCUMENTS

JP    2004 81385    3/2004

OTHER PUBLICATIONS

English Language Abstract of JP 2004-81385.

* cited by examiner

*Primary Examiner*—Anthony D Barfield
(74) *Attorney, Agent, or Firm*—Greenblum & Bernstein, P.L.C.

(57) ABSTRACT

According to one embodiment of the invention, there is provided a vehicle seat with a monitor, including: a seat back; a headrest including: a head receiving portion receiving a back of a head of a vehicle occupant; a hollow recess being formed on a reverse side of the head receiving portion, the headrest being disposed such that the monitor unit at least partly enters the hollow recess; a stay mounting to the seatback, the stay being detachably attached to the headrest; and an actuating mechanism capable of moving back and forth the head receiving portion relatively with respect to the seatback, the actuating mechanism being provided at a connecting portion between the stay of the headrest and the head receiving portion; and a monitor unit including the monitor, the monitor unit being installed above the seatback and in a rear of a headrest.

9 Claims, 12 Drawing Sheets

VEHICLE SEAT WITH MONITOR

TECHNICAL FIELD

The present invention relates to a vehicle seat with a monitor.

BACKGROUND ART

Conventionally, there is a type of a seat of a vehicle in which electrical equipment such as a monitor is assembled to a rear surface portion of a backrest on an upper surface of a seatback. For example, patent document 1 described below discloses a technique concerning an assembling structure for assembling a monitor unit to a seat. In this disclosure, the monitor unit and a headrest are configured as separate units. In addition, the headrest has a shape in which its rear surface portion is gouged out, and the monitor unit is adapted to be slid from below so as to be fitted therein. In addition, in the monitor unit, through holes are formed in its pedestal portion for allowing stays, i.e., leg portions of the headrest, to be inserted therein at the time of fitting the monitor unit into the headrest. Accordingly, by fitting the stays into the monitor unit while inserting the stays into the through holes, the both members can be assembled into a compact form which imparts a sense of unity. In addition, by virtue of the above-described configuration, the monitor unit can be configured to be separately independent so as not to follow the vertical movement of the headrest, i.e., the adjustment movement of the insertion length of the stays into the seatback. Therefore, since it is unnecessary to cause the wiring of the monitor unit to follow via the interior of the stay, it is possible to simplify the wiring in the interior of the seatback.

[Patent Document 1] U.S. Pat. No. 6,698,832

DISCLOSURE OF THE INVENTION

Problem that the Invention is to Solve

However, in the technique of the above-described disclosure, the configuration is such that the headrest is assembled to the monitor unit, and since a restriction is caused in its movable range, the headrest is has a simple configuration which permits only the adjustment movement in the vertical direction relative to the seatback.

The present invention has been devised to overcome the above-described problem, and a problem to be solved by the invention is to ensure that the adjustment of the back-and-forth position of the headrest with respect to the seatback can be performed even in the configuration in which the monitor unit is assembled to the headrest.

Means for Solving the Problems

To solve the above-described problem, the vehicle seat with a monitor in accordance with the invention adopts the following means.

First, according to a first aspect of the invention, there is provided a vehicle seat with a monitor in which a monitor unit is installed above a seatback and in the rear of a headrest, characterized in that: the headrest has a head receiving portion for receiving a back of a head of a vehicle occupant, a hollow recess being formed on a reverse side of the head receiving portion, the headrest being disposed such that at least a portion of the monitor unit enters the recess; that the headrest and the monitor unit are respectively supported and disposed independently and separately on an upper surface portion of the seatback, both being fitted to each other relatively movably; that a stay for mounting to the seatback withdrawably is provided on the headrest, an actuating mechanism capable of moving back and forth the head receiving portion relatively with respect to the seatback being provided at a connecting portion between the stay of the headrest and the head receiving portion; that the actuating mechanism is adapted to relatively move the head receiving portion with respect to the stay between a close position in which the head receiving portion has been brought close to a reverse portion of the monitor unit and a spaced-apart position in which the head receiving portion has been forwardly moved to be spaced apart from the close position; and that the head receiving portion is adapted to accept the relative approaching movement of the monitor unit by means of a recessed shape of the recess, and at least a portion of the monitor unit is accommodated in the recess regardless of the movement of the headrest.

According to this first aspect of the invention, the monitor unit has a hollow recess formed on the reverse side of the head receiving portion, and is disposed such that at least a portion of the monitor unit enters the recess, so that the monitor unit is assembled to the headrest into a compact form which imparts a sense of unity with the headrest. In addition, the head receiving portion of the headrest is adapted to be moved back and forthwith respect to the stay by an actuating mechanism. In this back-and-forth movement of the head receiving portion, the head receiving portion moves to the close position where it is close to the monitor unit located on its rear side. Specifically, this close position is a state position in which a portion of the monitor unit has entered the interior of the recess formed on the reverse side of the head receiving portion. Namely, the arrangement provided is such that the relative approaching movement of the monitor unit is accepted by the recessed shape of the recess in the head receiving portion, and the headrest which moves back and forth and at least a portion of the monitor unit overlap. As a result, the back-and-forth width of the configuration combining the headrest and the monitor unit is reduced, a sense of unity is imparted, and the appearance can be improved.

Next, according to a second aspect of the invention, in the above-described first aspect of the invention, the actuating mechanism is a hinge portion for hinge-coupling the head receiving portion of the headrest and the stay, and the head receiving portion serving as a front surface of the head receiving portion is adapted to be made to undergo swinging motion about the hinge portion in a back-and-forth direction.

According to this second aspect of the invention, the back-and-forth movement of the head receiving portion is effected by the swinging motion about the hinge portion provided between the head receiving portion and the stay.

Next, according to a third aspect of the invention, in the above-described first or second aspect of the invention, a curved portion having a curved shape for allowing the swinging motion of the headrest is provided in an upper portion of the monitor unit.

According to this third aspect of the invention, even if the headrest undergoes swinging motion to be moved back and forth, since the curved portion of the monitor unit allows the movement of the headrest, a gap is not formed between the monitor unit and the headrest, so that it is possible to attain improvement of the appearance.

Next, according to a fourth aspect of the invention, in any one of the above-described first to third aspects of the invention, an insertion and coupling structure between the stay of the headrest and the seatback has a structure in which, as the stay is inserted into an interior of an insertion port formed in an upper surface of the seatback, an adjustment groove formed in the stay is retained by a retaining pawl provided in the interior of the insertion port in such a manner as to be capable of projecting into and retracting from the interior of the insertion port, so as to restrict the movement of the stay in an inserting direction; wherein a plurality of adjustment grooves are formed in an inserting and drawing-out direction as the adjustment groove so as to allow adjustment of a position of an installed height of the headrest to be performed by the selection of the adjustment groove for being retained by the retaining pawl; and wherein a rear cover is mounted to a reverse surface portion of the head receiving portion so as to cover from a reverse surface side mounting structure portions of the head receiving portion and the stay which are exposed on an upper side of the monitor unit when the installed height of the headrest is raised.

According to this fourth aspect of the invention, the mounting structure portions of the head receiving portion and the stay are covered from their reverse surface side by the rear cover. When the installed height of the headrest is raised, this rear cover covers the aforementioned mounting structure portions exposed on the upper side of the monitor unit.

Next, according to a fifth aspect of the invention, in the above-described fourth aspect of the invention, the rear cover is fixed to a side of the stay.

According to this fifth aspect of the invention, the rear cover is not interlocked with the swinging motion of the headrest and is interlocked with only the vertical movement of the headrest. As a result, even if the headrest is swung, the rear cover allows the swinging of the headrest to be effected smoothly without interfering with the monitor unit. In addition, since the rear cover covers the gap with the monitor unit when the headrest moves vertically, the appearance can be improved.

Next, according to a sixth aspect of the invention, in the above-described fourth or fifth aspect of the invention, a front cover for covering from a front surface side mounting structure portions of the monitor unit and the seatback is mounted to the monitor unit, and wherein the front cover assumes a state of covering the structure portions which are seen through a gap from a front side which is formed between the headrest and the seatback when the installed height of the headrest is raised.

According to this sixth aspect of the invention, the mounting structure portions of the monitor unit and the seatback is covered from its front surface side by the front cover. When the installed height of the headrest is raised, this front cover covers the aforementioned structure portions exposed through the gap between the headrest and the seatback.

Next, according to a seventh aspect of the invention, in any one of the above-described first to sixth aspects of the invention, the monitor unit is hinge-coupled to the seatback and has a display screen adapted to be made to undergo swinging motion in the back-and-forth direction about the hinge portion which hinge-coupled.

According to this seventh aspect of the invention, as the monitor unit is made to undergo swinging motion about the hinge portion, the angle of inclination of the display screen can be varied.

Next, according to an eighth aspect of the invention, in the above-described seventh aspect of the invention, in a state in which the headrest is removed from the seatback, the monitor unit is adapted to be folded down by being reclined about the hinge portion toward the upper surface of the seatback.

According to this eighth aspect of the invention, the center of the hinge for adjusting the angle of inclination of the display screen of the monitor unit serves as the center of the hinge at the time of reclining the monitor unit toward the upper surface of the seatback.

Next, according to a ninth aspect of the invention, in any one of the above-described first to eighth aspects of the invention, side surface portions constituting surface portions on both left and right sides of the recess are respectively formed in the head receiving portion of the headrest, and the side surface portions are configured in a state of covering lateral gaps formed between the head receiving portion and the monitor unit at either moved position to which the head receiving portion has been moved back and forth.

According to this ninth aspect of the invention, the lateral gaps formed between the head receiving portion and the monitor unit are covered by the side surface portions constituting the surface portions on both left and right sides of the recess in the head receiving portion. These side surface portions cover the lateral gaps formed between the head receiving portion and the monitor unit at the time when the head receiving portion is moved forwardly.

Advantages of the Invention

In the invention, the following advantages can be obtained by adopting the above-described means.

First, according to the first aspect of the invention, it is possible to reduce the back-and-forth width in the configuration in which the headrest and the monitor unit are combined, so that even in the configuration in which the monitor unit is assembled to the headrest, the adjustment of the back-and-forth position of the headrest with respect to the seatback can be performed in a compact form. In addition, since the headrest which moves back and forth and at least a portion of the monitor unit overlap, it is possible to obtain an excellent appearance which imparts a sense of unity.

Further, according to the second aspect of the invention, since the hinge portion is used, the mechanism of adjusting the back-and-forth position of the headrest can be realized in a relatively simple configuration.

Further, according to the third aspect of the invention, a gap is not formed between the monitor unit and the headrest, thereby making it possible to improve the appearance.

Further, according to the fourth aspect of the invention, since the mounting structure portions of the head receiving portion and the stay are covered by the rear cover, it is possible to ensure that the appearance of the reverse surface side of the headrest is not impaired.

Further, according to the fifth aspect of the invention, the swinging motion of the headrest can be effected smoothly, and when the headrest is vertically moved, the gap with the monitor unit is covered, thereby making it possible to improve the appearance.

Further, according to the sixth aspect of the invention, since the mounting structure portions of the monitor unit and the seatback are covered by the front cover, it is possible to ensure that the appearance of the front surface side of the monitor unit which is seen through the gap between the headrest and the seatback is not impaired.

Further, according to the seventh aspect of the invention, since the hinge portion is used, the mechanism of adjusting the angle of inclination of the display screen of the monitor unit can be realized in a relatively simple configuration.

Further, according to the eighth aspect of the invention, the mechanism of adjusting the angle of inclination of the display screen of the monitor unit can be used jointly with the mechanism of reclining the monitor unit toward the upper surface of the seatback.

DESCRIPTION OF REFERENCE NUMERALS AND SIGNS

Figure 1:
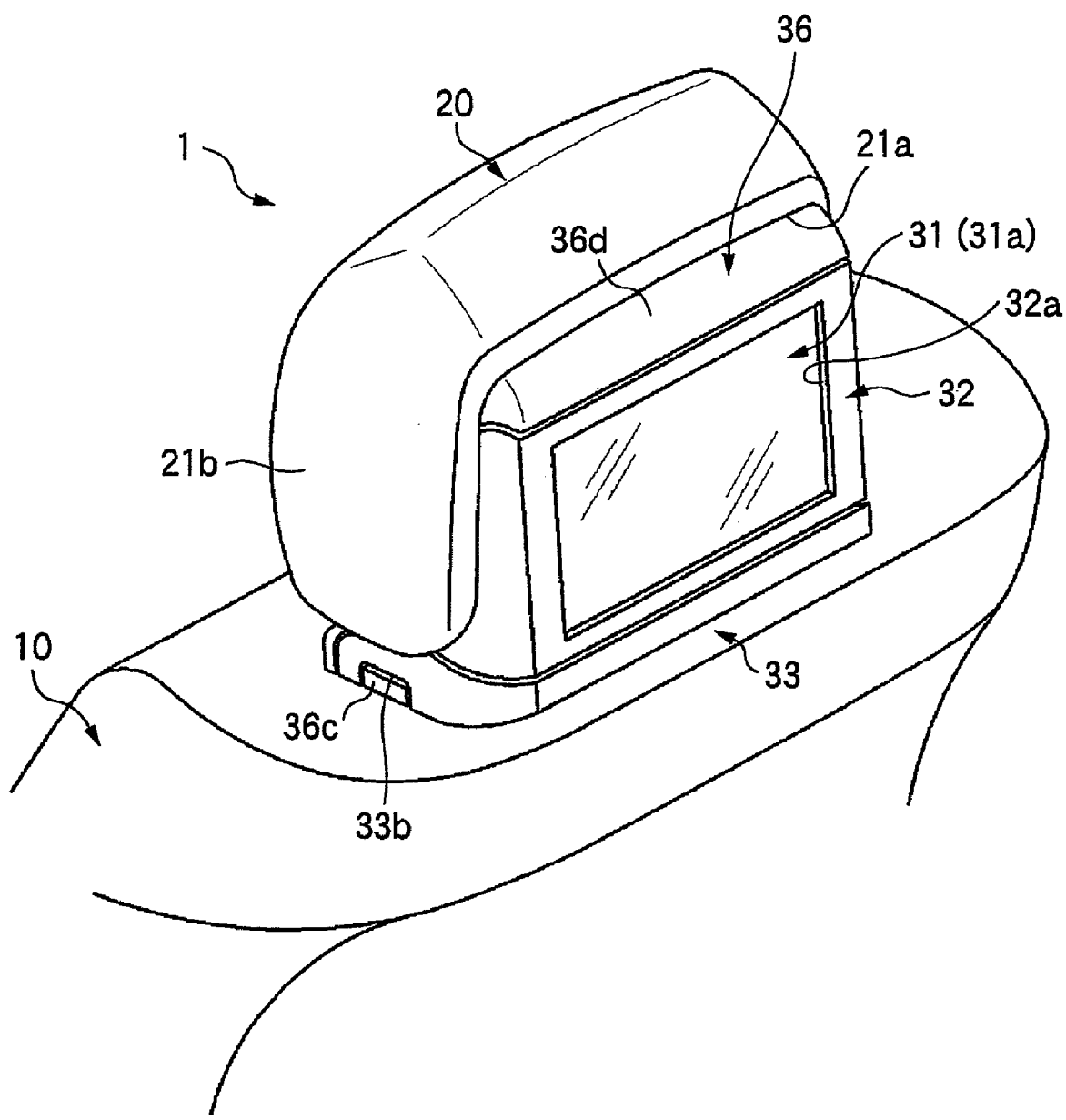
FIG. 1 is a perspective view illustrating a schematic structure of a vehicle seat with a monitor in accordance with embodiment 1.

1: seat
10: seatback
11: back frame
11a: fixing device
20: headrest
21: head receiving portion
21a: fitting recess
21b: side surface portion
21c: rear end portion
22: stay
22a: adjustment groove
22b: retaining groove
23: stay
24: supporting device
24a: hinge portion (actuating mechanism)
25: mounting fixture
26: rear cover
26a: curved portion
31: monitor unit
31a: display screen
31b: reverse surface
31c: mounting fixture
32: monitor cover
32a: fitting port
32b: side surface portion
33: lower cover
33a: sliding surface
33b: button hole
34: supporting device
34a: hinge portion
36: front cover
36a: cover portion
36b: through hole
36c: release button
36d: curved portion
40: support
41: insertion port
42: retaining pawl
43: operation knob
50: support
51: insertion port
S: inserting direction
H: drawing-out direction
tb: gap
tf: gap
131: monitor unit
132: monitor cover
134: supporting device
136: front cover
136c: release button
137: mounting base plate

BEST MODE FOR CARRYING OUT THE INVENTION

Hereafter, referring to the drawings, a description will be given of the embodiments of the best mode for carrying out the invention.

EMBODIMENT 1

Figure 2:
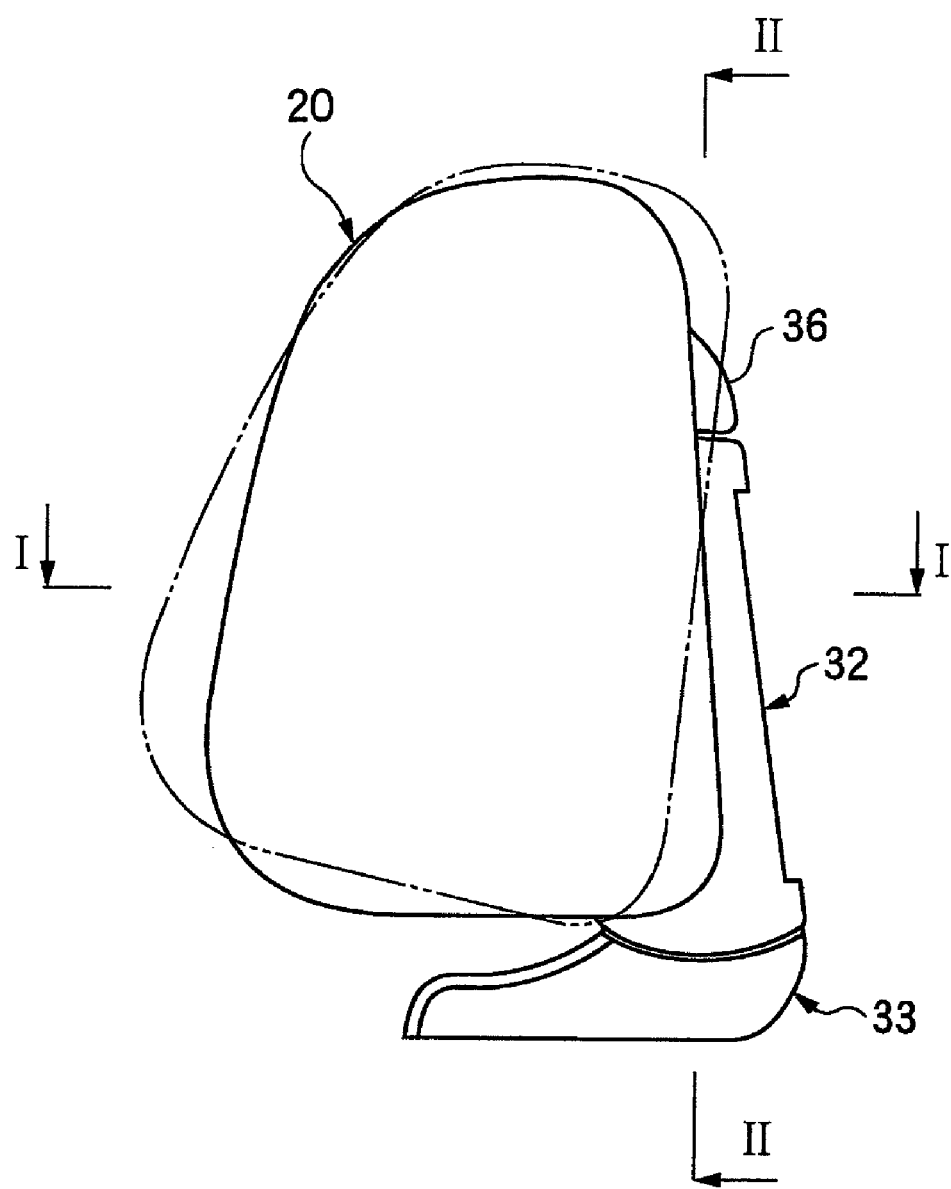
FIG. 2 is a left side elevational view of FIG. 1.
Figure 3:
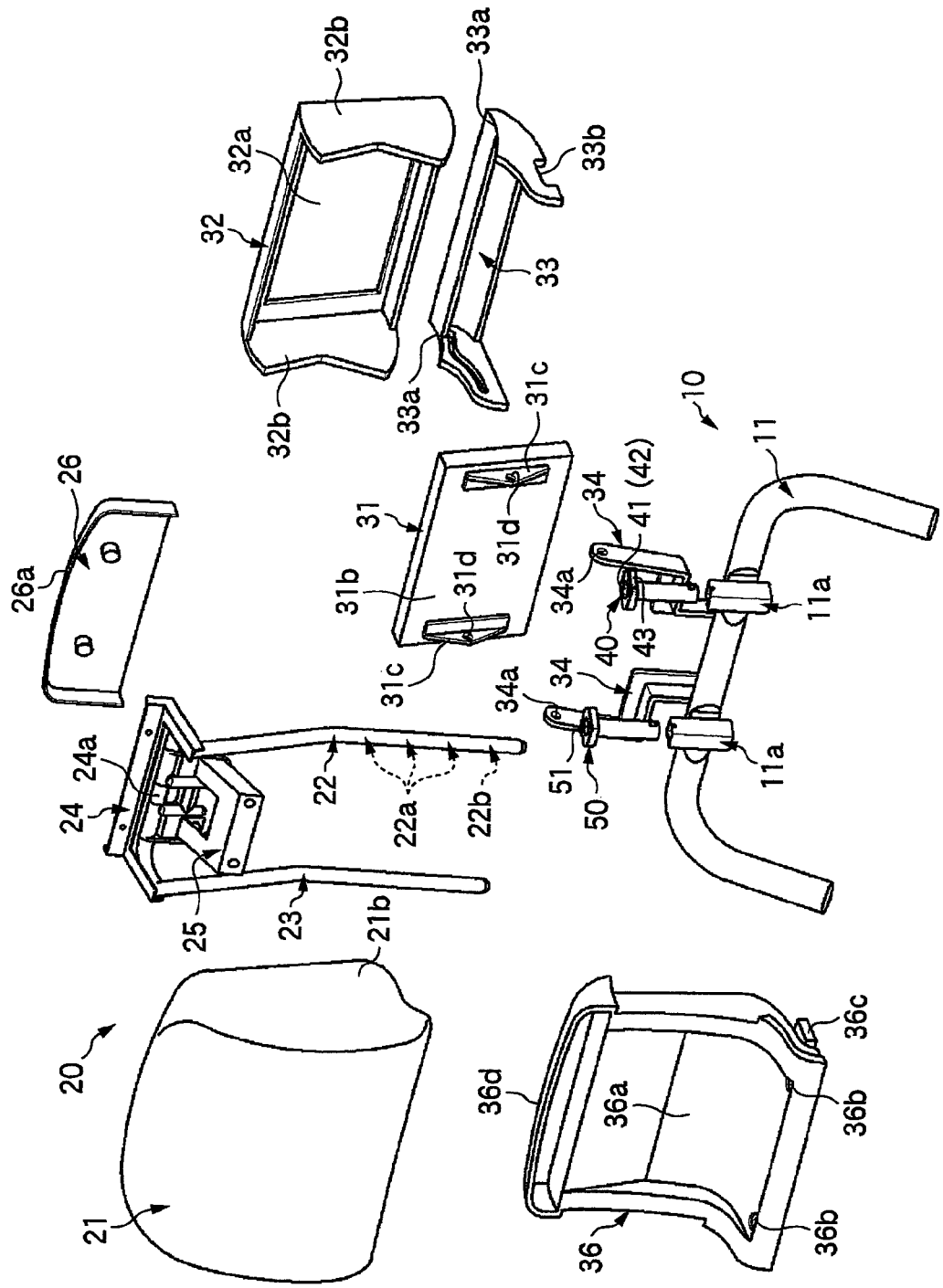
FIG. 3 is an exploded perspective view of a mounting structure of a headrest and a monitor unit.
Figure 4:
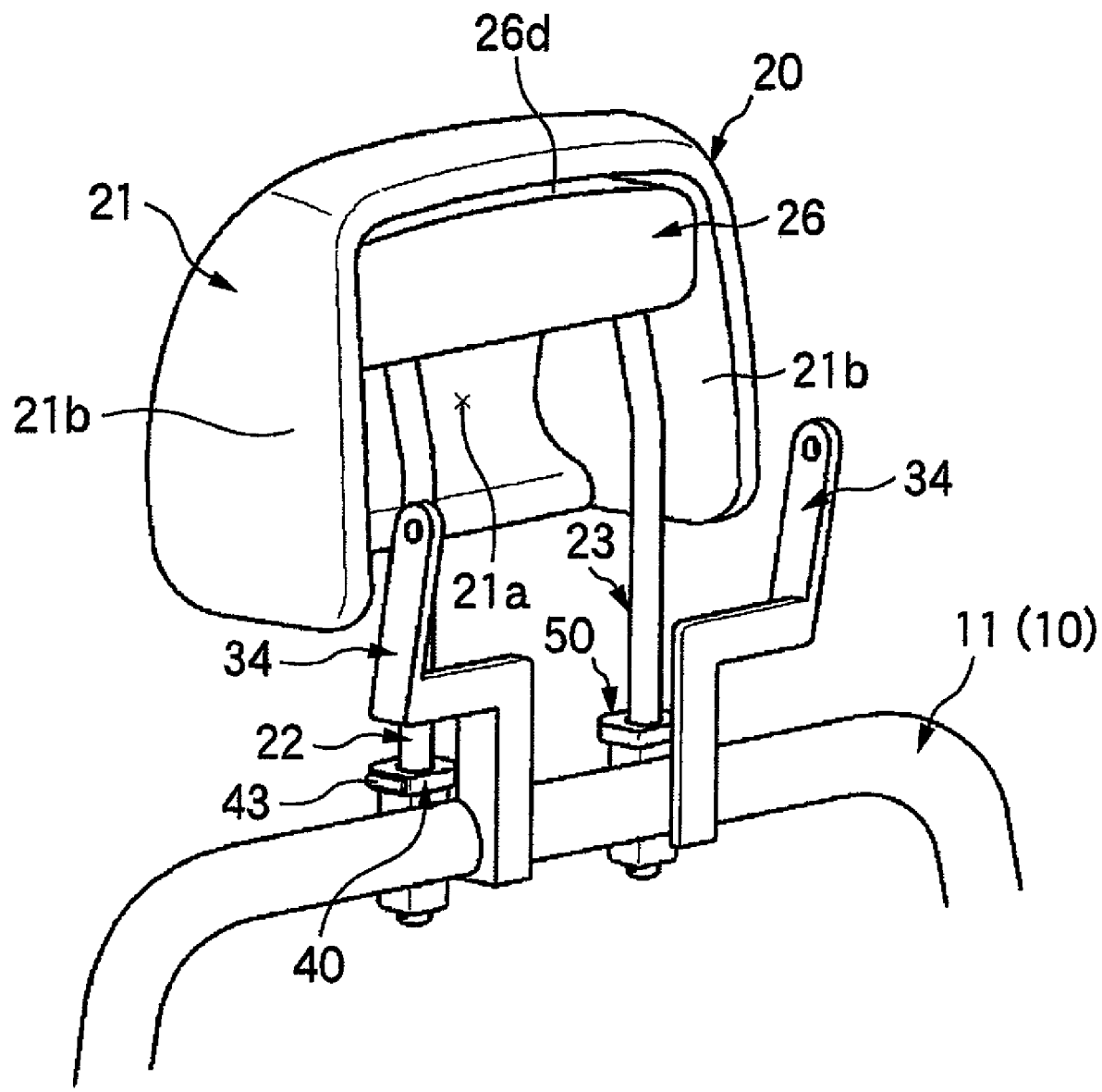
FIG. 4 is a perspective view illustrating an installed state of the headrest.
Figure 5:
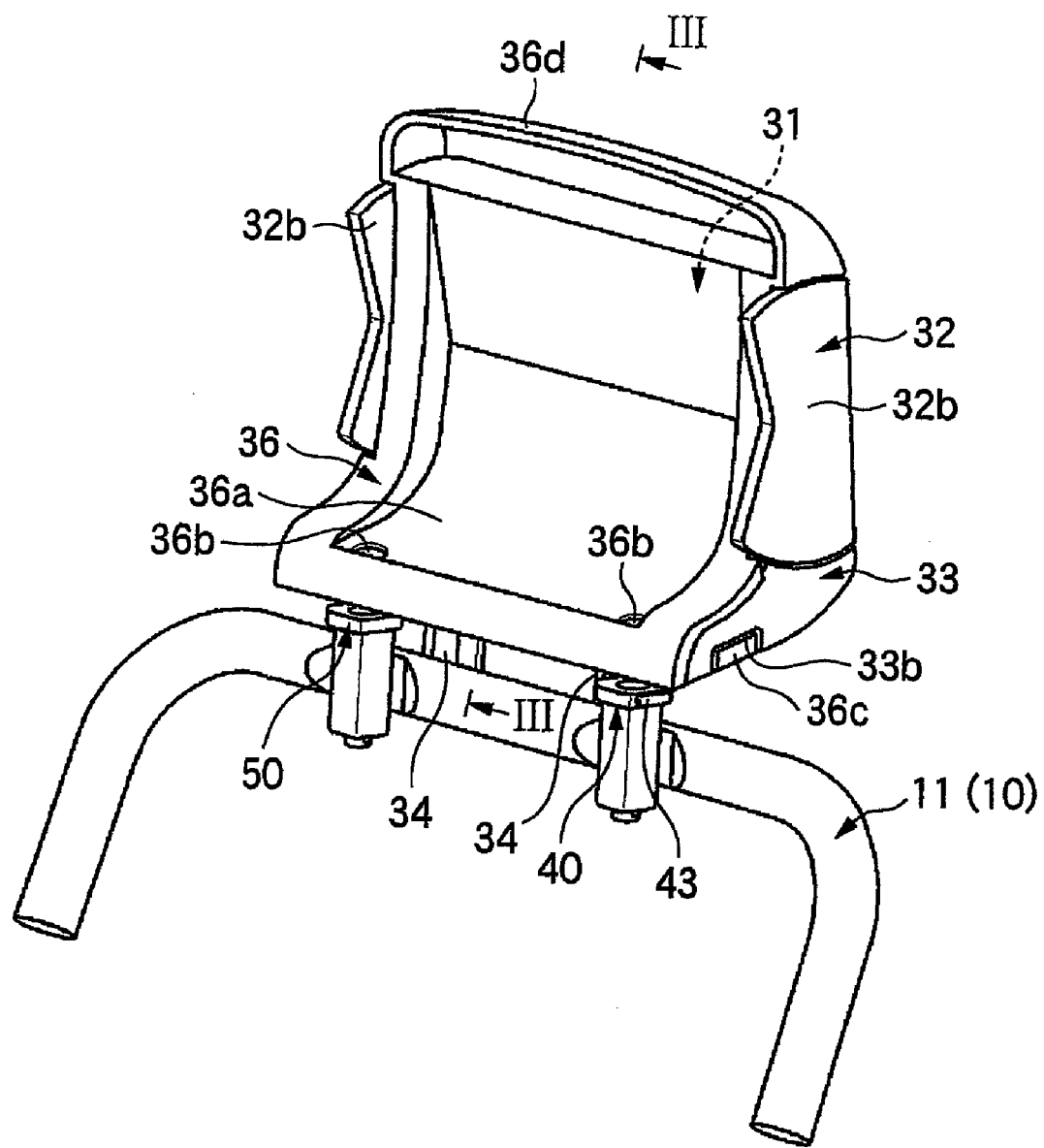
FIG. 5 is a perspective view illustrating an installed state of the monitor unit.
Figure 6:
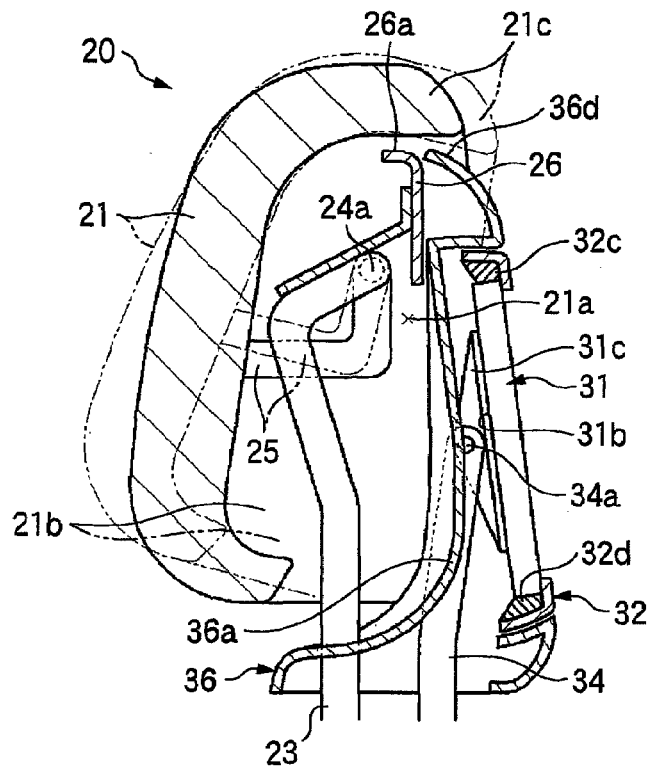
FIG. 6 is a side cross-sectional view corresponding to a cross section taken along line III-III in FIG. 5, and illustrates a state in which a back-and-forth position of the headrest has been changed.
Figure 7:
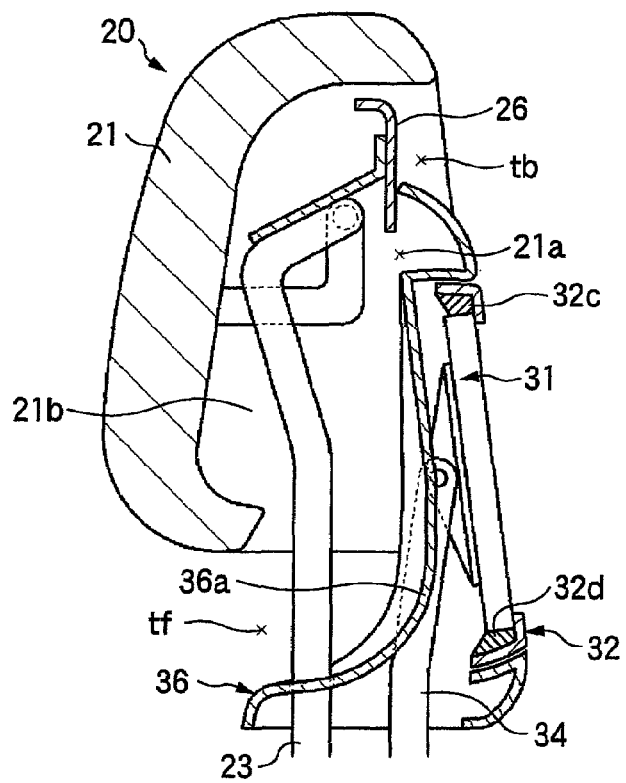
FIG. 7 is a side cross-sectional view corresponding to a cross section taken along line III-III in FIG. 5, and illustrates a state in which a heightwise position of the headrest has been raised.
Figure 8:
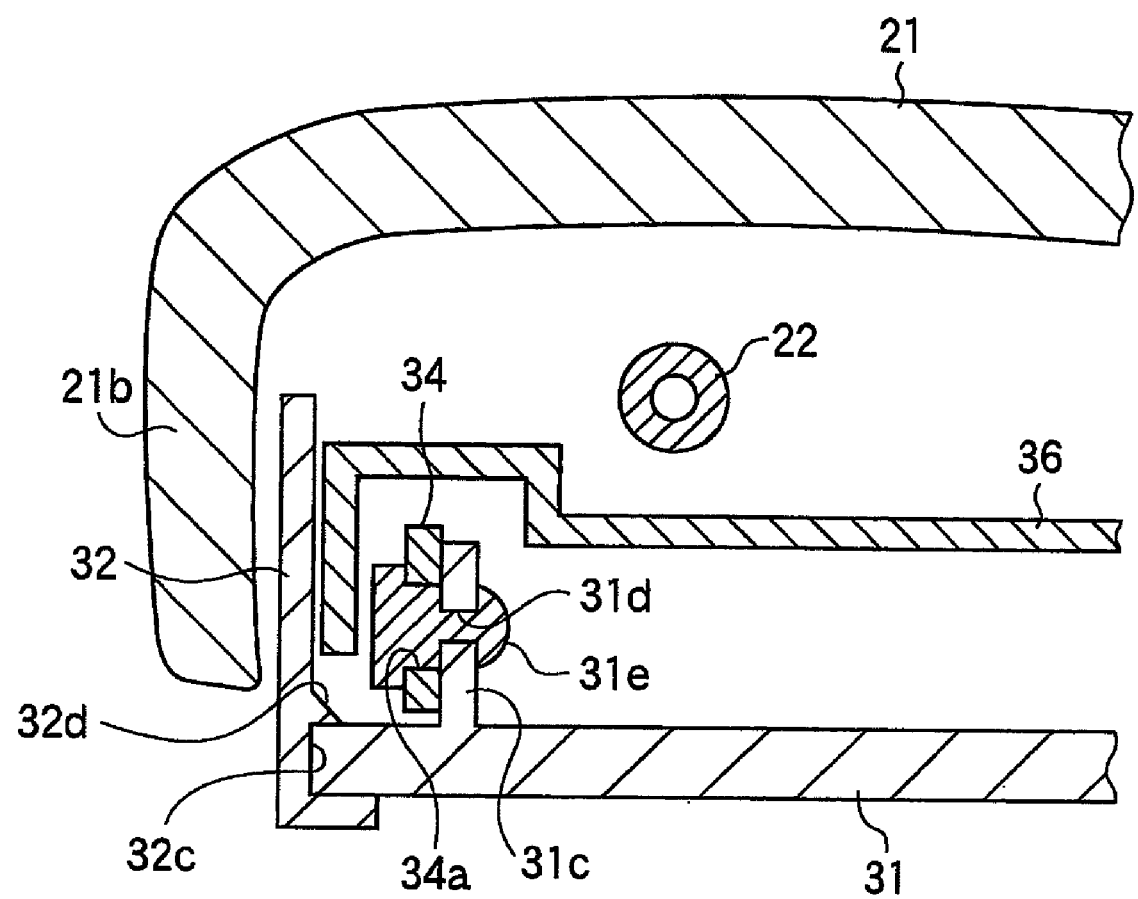
FIG. 8 is a cross-sectional view taken along line I-I in FIG. 1.
Figure 9:
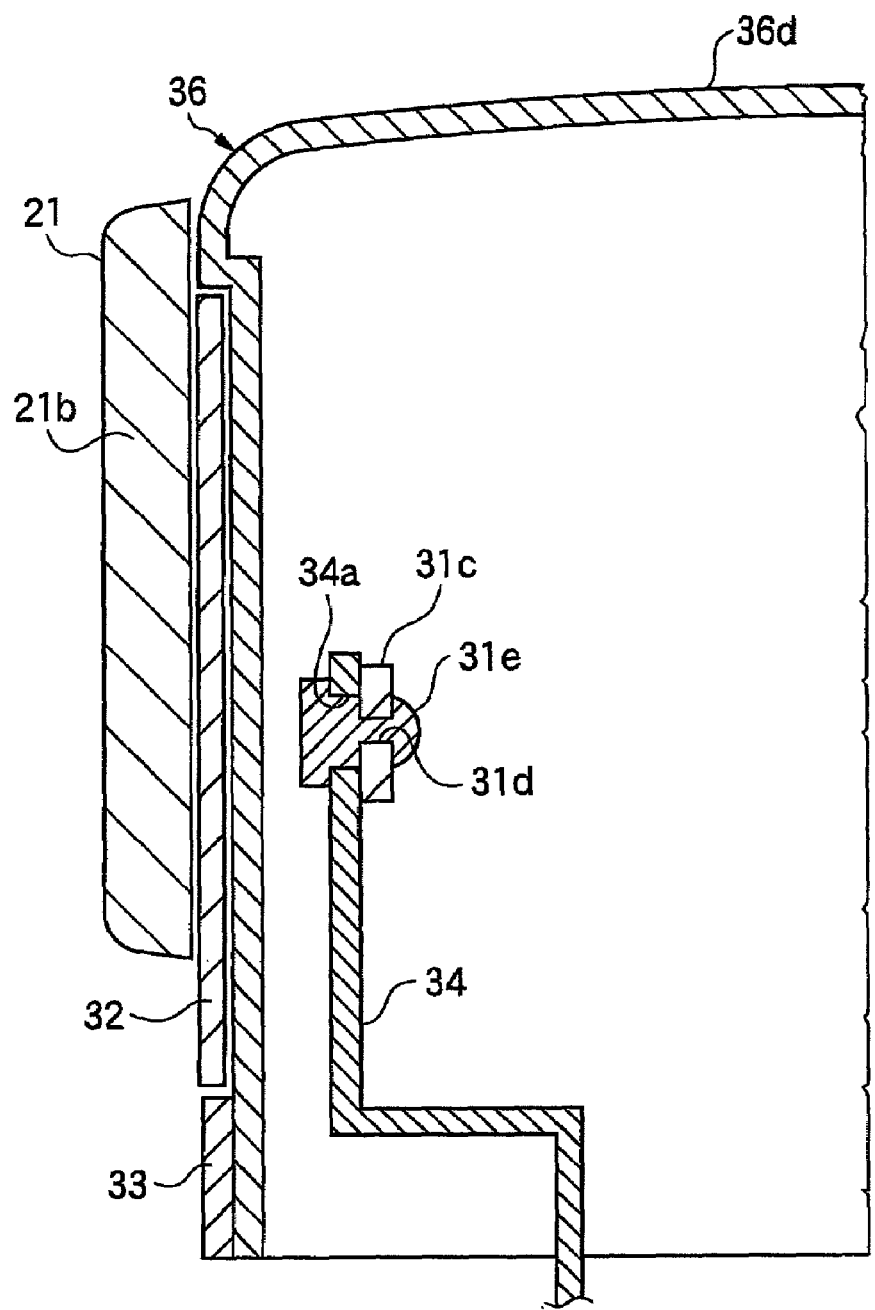
FIG. 9 is a cross-sectional view taken along line II-II in FIG. 2.
Figure 10:
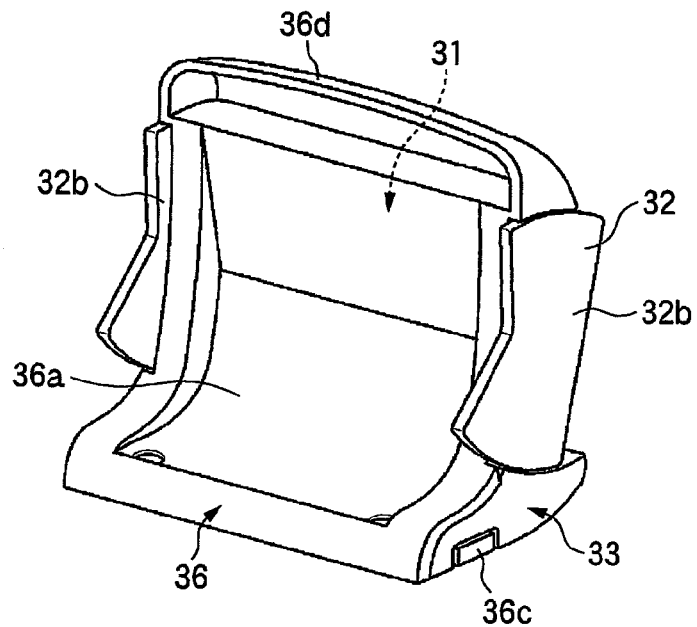
FIG. 10 is a perspective view illustrating a state in which the angle of inclination of the monitor unit has been changed.
Figure 11:
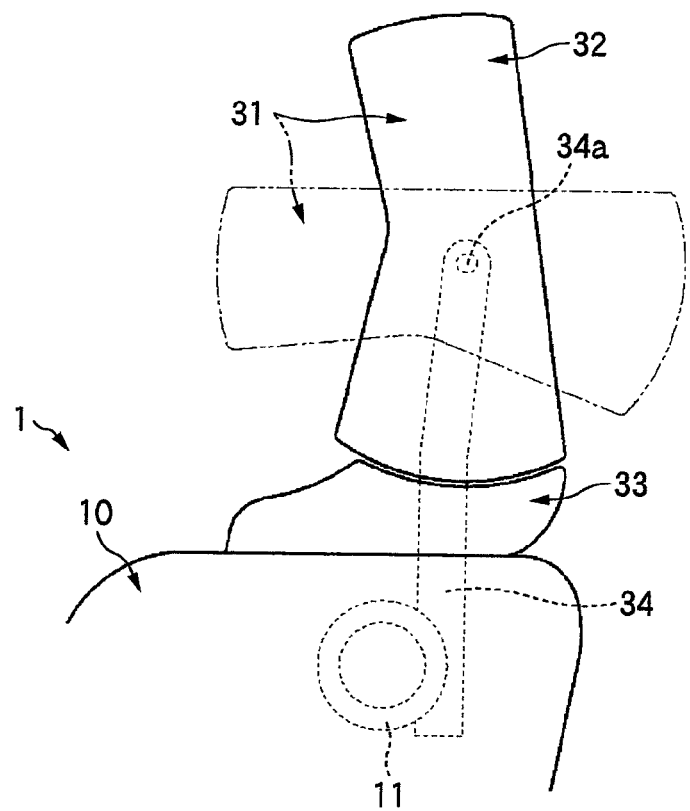
FIG. 11 is a side elevational view for illustrating a state in which the monitor unit is folded down by being reclined toward the upper surface of a seatback.
Figure 12:
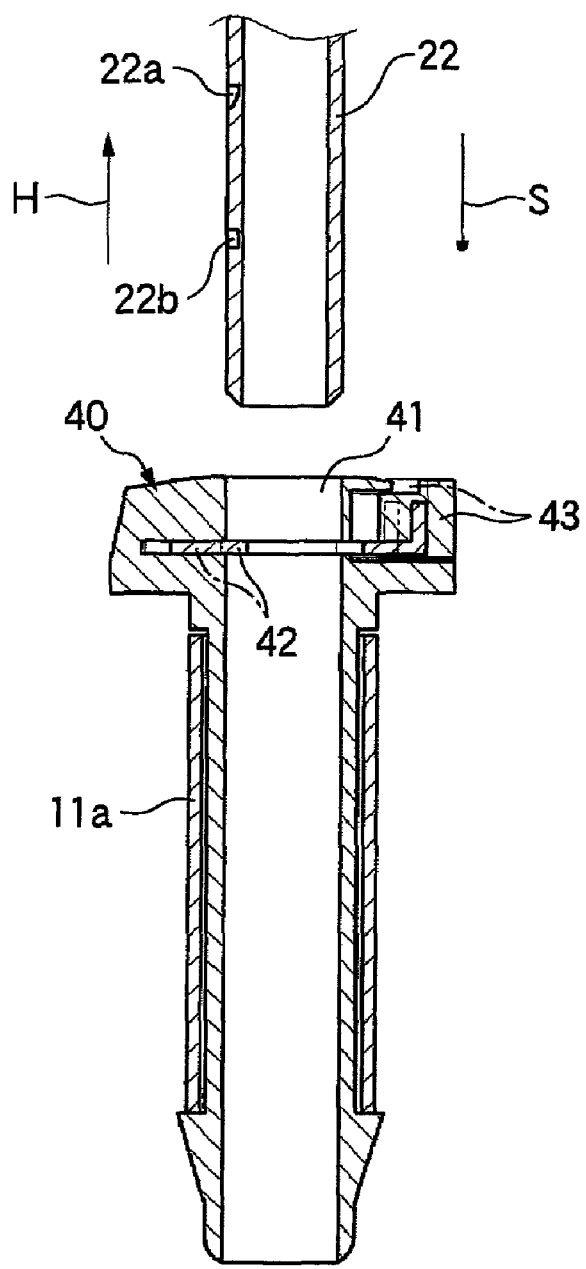
FIG. 12 is a side cross-sectional view illustrating an inserting structure of a stay.
Figure 13:
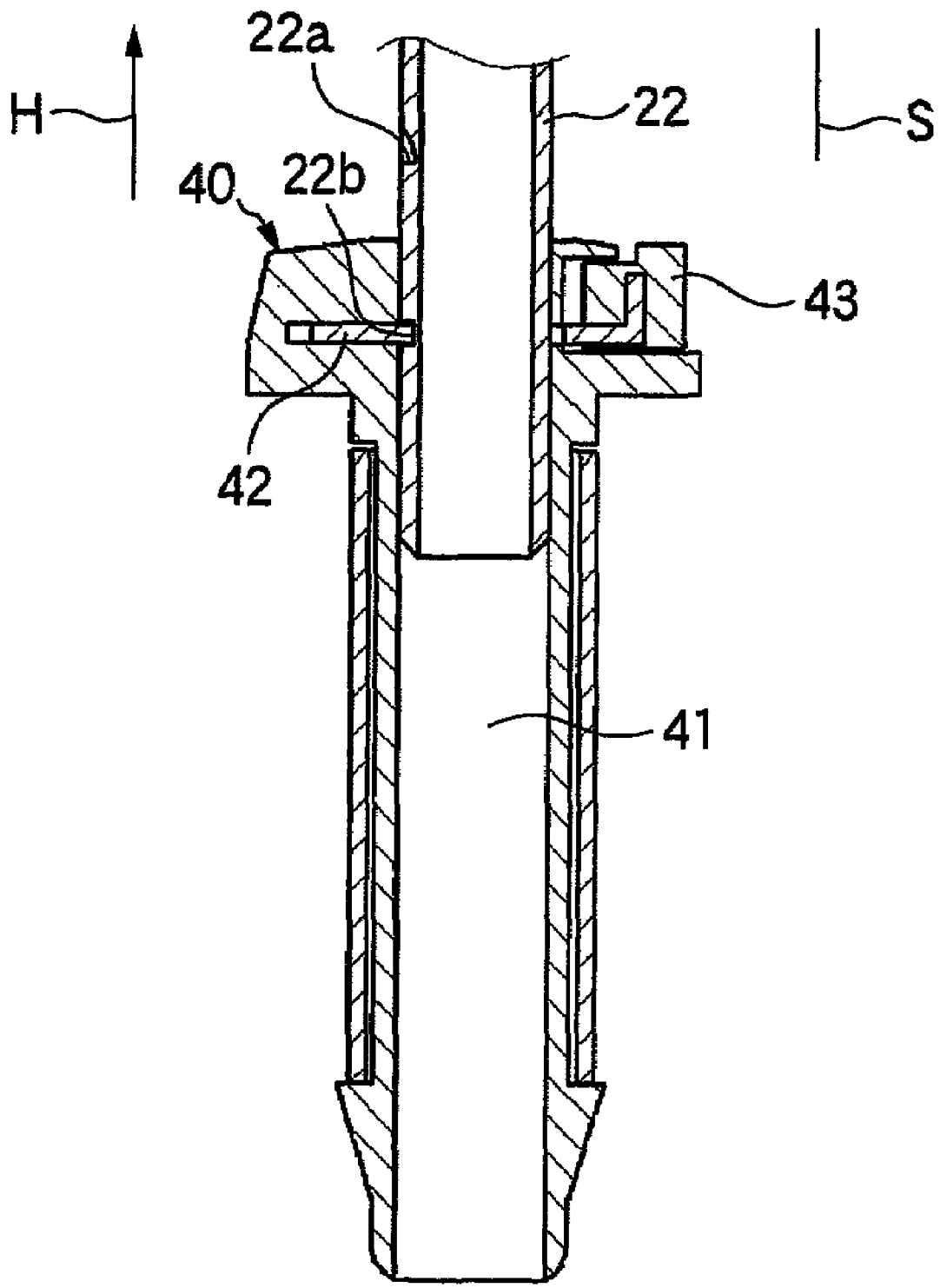
FIG. 13 is a side cross-sectional view illustrating an inserted state of the stay.

First, referring to FIGS. 1 to 13, a description will be given of the configuration of a vehicle seat with a monitor in accordance with embodiment 1. FIG. 1 is a perspective view illustrating a schematic structure of the vehicle seat with a monitor. FIG. 2 is a left side elevational view of FIG. 1. FIG. 3 is an exploded perspective view of a mounting structure of a headrest 20 and a monitor unit 31. FIG. 4 is a perspective view illustrating an installed state of the headrest 20. FIG. 5 is a perspective view illustrating an installed state of the monitor unit 31. FIG. 6 is a side cross-sectional view corresponding to a cross section taken along line III-III in FIG. 5, and illustrates a state in which a back-and-forth position of the headrest 20 has been changed. FIG. 7 is a side cross-sectional view corresponding to a cross section taken along line III-III in FIG. 5, and illustrates a state in which the heightwise position of the headrest 20 has been raised. FIG. 8 is a cross-sectional view taken along line I-I in FIG. 1. FIG. 9 is a cross-sectional view taken along line II-II in FIG. 2. FIG. 10 is a perspective view illustrating a state in which the angle of inclination of the monitor unit 31 has been changed. FIG. 11 is a side elevational view for illustrating a state in which the monitor unit 31 is folded down by being reclined toward the upper surface of a seatback 10. FIG. 12 is a side cross-sectional view illustrating an inserting structure of a stay 22. FIG. 13 is a side cross-sectional view illustrating an inserted state of the stay 22.

It should be noted that, in the following description, an "obverse surface" with respect to structural members such as the headrest 20 and the monitor unit 31 means a surface which faces the outer side in their assembled structure. Meanwhile, a "reverse surface" means a surface on the opposite side to the "obverse surface." Further, a "front surface" means a surface which faces the front side with respect to the installed direction of a seat 1, whereas a "rear surface" means a surface on an opposite side thereto.

As is well shown in FIG. 1, in the seat 1 in accordance with this embodiment, the monitor unit 31 is installed on an upper surface portion of the seatback 10 constituting a backrest. This monitor unit 31 is disposed at the position of a reverse surface portion of the headrest 20 which is similarly installed on the upper surface portion of the seatback 10. Specifically, the monitor unit 31 is disposed with its display screen 31a facing a seat (not shown) disposed on the rear side.

Here, FIG. 2 shows a left side surface of the headrest 20. FIG. 3 illustrates in an exploded perspective view a mounting structure of the headrest 20 and the monitor unit 31. In addition, FIG. 4 shows an installed state of the headrest 20 as a single unit. In addition, FIG. 5 shows an installed state of the monitor unit 31. As shown in these drawings, the headrest 20 and the monitor unit 31 are mounted on a back frame 11 constituting the frame of the seatback 10.

Hereafter, a detailed description will be given of the mounting structure of the headrest 20 and the monitor unit 31.

First, a description will be given of the headrest 20 and its mounting structure.

Namely, as is well shown in FIGS. 2 and 3, the headrest 20 has a head receiving portion 21, stays 22 and 23, a supporting device 24, a mounting fixture 25, and a rear cover 26.

Specifically, the head receiving portion 21 has a buffer structure in its front surface portion and is adapted to receive and support the back of an occupant's head. In addition, as shown in FIG. 4, the head receiving portion 21 has a shape in which its reverse surface portion is gouged out, and this gauged-out portion is formed as a fitting recess 21a. Further, side surface portions 21b for constituting surface portions on both left and right sides of the fitting recess 21a are respectively formed in the head receiving portion 21.

Since the side surface portions 21b are disposed so as to cover the side surfaces of the monitor unit 31, the monitor unit 31 is mounted in such a manner as to constantly overlap the headrest 20, thereby imparting a sense of unity and an attractive appearance.

Next, as shown in FIG. 3, the stays 22 and 23 have their upper end portions coupled to the supporting device 24. As a result, the stays 22 and 23 and the supporting device 24 are, as a whole, assembled as component parts of a gate-shaped integrated type. As the supporting device 24 is mounted on the reverse surface portion of the head receiving portion 21, these stays 22 and 23 are assembled in a state in which two rod-like members are suspended from the head receiving portion 21. The stays 22 and 23 thus assembled serve as leg portions for mounting the headrest 20. Namely, the stays 22 and 23 couple the headrest 20 to the seatback 10 as the stays 22 and 23 are respectively inserted into two supports 40 and 50 installed on the upper surface portion of the back frame 11, as shown in FIG. 4. By means of this coupling, the headrest 20 can be held in a state of being installed on the upper surface portion of the seatback 10. It should be noted that a description will be given later of the coupling structure between the stays 22 and 23 and the supports 40 and 50.

Here, returning to FIG. 3, the aforementioned supporting device 24 is mounted to the head receiving portion 21 by means of the mounting fixture 25. This mounting fixture 25 is axially rotatably coupled to a hinge portion 24a of the supporting device 24. Further, the mounting fixture 25 is integrally mounted to the reverse surface portion of the head receiving portion 21, as shown in FIG. 6. As a result, the head receiving surface (front surface) of the head receiving portion 21 is made to undergo swinging motion about the hinge portion 24a in the back-and-forth direction relative to the stays 22 and 23. Here, the head receiving portion 21 is adapted to accept the relative approaching movement of the monitor unit 31 by means of the recessed shape of the fitting recess 21a formed in its reverse surface portion. As a result, the swinging motion of the head receiving portion 21 can be effected between a close position indicated by the solid lines in the drawing and a spaced-apart position indicated by the imaginary lines. The close position indicated by the solid lines is a state position in which assembly structures, such as the monitor unit 31 and a front cover 36 assembled on its reverse surface 31b side, are entered into the interior of the shape of the head receiving portion 21 to allow the head receiving portion 21 to be brought close to the reverse surface 31b of the monitor unit 31. As a result, the swinging width of the back-and-forth movement of the head receiving portion 21 is absorbed within the shape of the head receiving portion 21. In addition, the spaced-apart position indicated by the imaginary lines is a state position in which the head receiving portion 21 has been forwardly moved to be spaced apart from the reverse surface 31b of the monitor unit 31 by being rotated about the hinge portion 24a in a counterclockwise direction shown in the drawing with respect to the above-described close position. At this time, in conjunction with the spaced movement of the head receiving portion 21, a rear end portion 21c on the upper side of the head receiving portion 21 moves in a right downward direction shown in the drawing. However, the arrangement provided is such that the spaced apart movement of the head receiving portion 21 is allowed by a curved portion 36d formed in a front cover 36 where the rear end portion 21c is located on its lower side. As a result, when the headrest 20 is made to undergo swinging motion and is moved back and forth, the curved portion 36d of the front cover 36 allows the movement of the headrest 20, so that a gap is not produced between the monitor unit 31 and the headrest 20, thereby attaining the improvement of the appearance. It should be noted that the details of the front cover 36 will be described later. In addition, the above-described swinging motion of the head receiving portion 21 is constantly effected in a state in which the side surface portions 21b of the head receiving portion 21 face the side surfaces of the front cover 36 (see FIG. 1). As a result, even if the headrest 20 undergoes swinging motion, the mounting structure portions of the stays 22 and 23 and the head receiving portion 21 are covered so as not to be seen through the gaps between the headrest 20 and the monitor unit 31.

Next, as shown in FIG. 4, the rear cover 26 is mounted to the reverse surface portion of the head receiving portion 21 by means of the supporting device 24. This rear cover 26 is made of a synthetic resin and is disposed in such a manner as to cover the above-mentioned mounting structure portions of the stays 22 and 23 and the head receiving portion 21 from the reverse surface side. Specifically, the rear cover 26 has a plate shape extending in a suspended direction from an upper portion of the reverse surface portion of the head receiving portion 21, and has a curved portion 26a for allowing the spaced apart movement of the head receiving portion 21 at its upper surface. As a result, as shown in FIG. 7, even at the time of the raised state of the installed height of the headrest 20, the rear cover 26 covers the mounting structure portions of the stays 22 and 23 and the head receiving portion 21 from the rear surface side so that they will not be seen through a gap tb which is open on the upper side of the monitor unit 31. Also, when the headrest 20 undergoes swinging motion and moves back and forth, the curved portion 26a of the rear cover 26 allows the movement of the headrest 20, so that a gap is not produced between the monitor unit 31 and the headrest 20, thereby attaining the improvement of the appearance. In addition, since the rear cover 26 is fixed to the supporting device 24 on the stays 22 and 23 side, the rear cover 26 is not interlocked with the swinging motion of the headrest 20 and is interlocked with only the vertical movement of the headrest 20. As a result, even if the headrest 20 is swung, the rear cover 26 allows the swinging of the headrest 20 to be effected smoothly without interfering with the monitor unit 31, and since the rear cover 26 covers the gap with the monitor unit 31 when the headrest 20 moves vertically, the appearance improves.

Next, a description will be given of the coupling structure between the stays 22 and 23 and the supports 40 and 50 of the headrest 20.

Namely, as is well shown in FIG. 3, as for the stays 22 and 23, their lower end portions which are leading ends in the inserting direction are formed in a tapered manner. As a result, when the stays 22 and 23 are respectively inserted into insertion ports 41 and 51 of the supports 40 and 50, the tapered surfaces serve as guide surfaces, thereby facilitating the insertion of the stays 22 and 23. Meanwhile, a plurality of adjustment grooves 22a and a retaining groove 22b are formed in one stay 22 on its side surface facing the other stay 23 along the longitudinal direction. Specifically, the retaining groove 22b is formed on the lower side of the adjustment groove 22a formed at the lowest position. In addition, the respective supports 40 and 50 are respectively inserted and fixed in tubular fixing devices 11a fixed at two locations on the front side of the upper portion of the back frame 11.

Here, the configurations of the stay 22 and the support 40 are shown in detail in FIG. 12. As shown in the drawing, a retaining pawl 42 which is capable of retaining the stay 22 and preventing its movement is provided in the insertion port 41 of the support 40. This retaining pawl 42 is held by being constantly urged in a state in which it projects into the interior of the insertion port 41. In addition, an operation knob 43 is integrally provided on the retaining pawl 42. This operation knob 43 is capable of moving the retaining pawl 42 against the aforementioned urging force as a pushing operation in the leftward direction in the plane of the drawing is performed. In addition, the retaining pawl 42 can be temporarily withdrawn out of the port by its movement caused by this operation knob 43 (state of the imaginary lines).

Accordingly, as the stay 22 is continued to be inserted with the operation knob 43 being subjected to the pushing operation, and the operation of the operation knob 43 is stopped after the lower end portion of the stay 222 has passed the retaining pawl 42, the retaining pawl 42 can be abutted against the outer peripheral surface of the stay 22 and can be set in a state of being pushed and retreated. It should be noted that the retaining pawl 42 may be configured such as to be directly pushed and retreated by the tapered surface of the stay 22 which is inserted.

Then, as the stay 22 is further inserted into the interior of the insertion port 41, i.e., in an inserting direction S, the heightwise positions of the retaining pawl 42 and the retaining groove 22b coincide in the course of time. As a result, the retaining pawl 42 is thrust into the retaining groove 22b by its resilient restoring force and retains it (see FIG. 13). Here, the cross-sectional shapes of the retaining groove 22b and the retaining pawl 42 are illustrated in detail in FIG. 12. Namely, the cross-sectional shape of the retaining groove 22b is formed in a U-shape in which its upper and lower surfaces forming its opening surfaces rise up straightly in the radial direction of the stay 22. Meanwhile, the cross-sectional shape of the retaining pawl 42 is formed in a projecting shape which coincides with the U-shape of the retaining groove 22b. Accordingly, as shown in FIG. 13, as the retaining groove 22b and the retaining pawl 42 having the aforementioned cross-sectional shapes are retained, the stay 22 is set in a state in which its movement in the inserting direction S and a drawing-out direction H is restrained.

Then, as the operation knob 43 is subjected to the pushing operation in the above-described retained state, the state of retention between the retaining pawl 42 and the retaining groove 22b is released. As a result, the stay 22 can be further inserted into the interior of the insertion port 41. Accordingly, as the stay 22 is continued to be inserted into the interior of the insertion port 41, the heightwise positions of the retaining pawl 42 and the adjustment groove 22a coincide in the course of time. As a result, the retaining pawl 42 is thrust into the adjustment groove 22a by its resilient restoring force, and retains it (not shown). Here, the cross-sectional shape of the adjustment groove 22a is illustrated in detail in FIG. 12. Namely, the cross-sectional shape of the adjustment groove 22a is formed in a shape in which its upper surface forming its opening surface rises up straightly in the radial direction of the stay 22. Meanwhile, a lower surface forming its opening surface is formed as an inclined surface which gently rises up toward the outer peripheral surface of the stay 22. Accordingly, as the adjustment groove 22a and the retaining pawl 42 having the aforementioned cross-sectional shapes are retained, the stay 22 is set in a state in which its movement in the inserting direction S is restrained, but its movement in the drawing-out direction H is allowed.

Then, as the stay 22 is further inserted by performing the pushing operation of the operation knob 43 in the above-described retained state, the retaining pawl 42 can be consecutively retained by each adjustment groove 22a. In this way, the adjustment of the position of the installed height of the headrest 20 can be performed by adjusting the amount of insertion of the stay 22. It should be noted that, in the state in which the retaining pawl 42 and the adjustment groove 22a are retained, if the headrest 20 as it is operated so as to be lifted up in the drawing-out direction H, the stay 22 can be continued to be drawn out through the insertion port 41. However, when the stay 22 is continued to be drawn out, and the retaining pawl 42 and the retaining groove 22b are retained, the drawing-out movement of the stay 22 is restrained. Namely, the arrangement provided is such that, by virtue of this retaining structure, even if the headrest 20 is lifted up by chance in the drawing-out direction H, the installed state of the seatback 10 is maintained.

Next, a description will be given of the monitor unit 31 and its mounting structure.

Namely, as is well shown in FIG. 3, the mounting structure of the monitor unit 31 is comprised of a monitor cover 32, a lower cover 33, supporting devices 34, and the front cover 36.

Specifically, the monitor cover 32 is made of a synthetic resin and is formed in a frame shape having a fitting opening 32a of a size allowing the monitor unit 31 to be fitted therein. As shown in FIG. 1, this monitor cover 32 is assembled in a state in which the display screen 31a of the monitor unit 31 is exposed from the fitting opening 32a and its outer frame is covered thereby. In addition, returning to FIG. 3, side surface portions 32b which are so shaped that they protrude forward so as to cover both side portions of the monitor unit 31 are formed in frame portions on both left and right sides of the monitor cover 32. An upper end surface and a lower end surface of this side surface portion 32b are formed in rounded curved shapes. Further, as shown in detail in FIG. 8, since a protrusion 32d is formed at an edge of a fitting groove 32c for preventing the monitor unit 31 from coming of is formed at the side surface portion 32b, the monitor unit 31 is assembled in such a manner as to be prevented from coming off. In addition, as shown in FIG. 6, the guides 32c and 32d for preventing the monitor unit 31 from becoming positioning offset in the vertical direction are provided at an upper edge and a lower edge of the fitting port 32a of the monitor cover 32.

Next, the lower cover 33 is made of a synthetic resin and is formed in such as the shape of a pedestal for supporting the monitor cover 32 from below, as shown in FIG. 3. This lower cover 33 is assembled to the lower side, and at its saucer-shaped sliding surface 33a formed on the upper surfaces of its left and right both side portions slidably supports the side surface portions 32b of the monitor cover 32 from below. In addition, a button hole 33b is formed at a lower position of the left side portion of the lower cover 33 (side portion at right on this side in the plane of the drawing). When the lower cover 33 and the front cover 36, which will be described later, are assembled, this button hole 33b is adapted to be located outside a release button 36c provided on the left side portion of this front cover 36. As a result, the arrangement provided is such that a finger can be inserted from outside through the button hole 33b with respect to the release button 36c.

Next, as shown in FIG. 3, the supporting devices 34 are constituted by two frame members and are fixed by being welded to upper rear-side positions of the back frame 11. As for these two frame members, mounting fixtures 31c fixed to the reverse surface 31b of the monitor unit 31 are adapted to be respectively hinge-coupled to their upper end portions. As shown in detail in FIGS. 8 and 9, after a pin 31e is inserted in a hinge portion 34a formed in an end portion of the supporting device 34 and a pin hole 31d of the mounting fixture 31c, an end portion of the pin 31e is caulked to as to be fixed. As a result, the monitor unit 31 hinge-coupled to the supporting devices 34 is set in a state of being axially rotatable about the hinge portions 34a. Then, it is possible to perform the adjustment of the angle of inclination of the display screen 31a (see FIG. 1) by this axial rotation. Here, the supporting device 34 is set in a shape in which it is bent toward the rear side of the vehicle in a chevron shape, as shown in FIG. 6. Meanwhile, the mounting fixture 31c is formed in a shape in which it is chamfered into a triangular shape with the hinge-coupled portion set as an apex. As a result, the monitor unit 31 and the mounting fixtures 31c are difficult to interfere with a cover portion 36a of the front cover 36 which will be described later, and a region where the monitor unit 31 is axially rotatable is thereby secured.

Next, the front cover 36 is made of a synthetic resin and is adapted to be mounted on the reverse surface 31b (front surface) side of the monitor unit 31, as shown in FIG. 3. As shown in FIG. 5, this front cover 36 is assembled to the monitor cover 32 and the lower cover 33 by fitting in such a manner as to sandwich the monitor unit 31. Here, the planar cover portion 36a for covering the aforementioned mounting structure portions of the supporting devices 34 and the monitor unit 31 from the front surface side is formed in the front cover 36. This cover portion 36a has a shape in which it rises upward from a lower portion of the front cover 36 in the shape of a curved surface, so as to fully cover the mounting structure portions mentioned above. As a result, as shown in FIG. 7, even at the time of the raised state of the installed height of the headrest 20, the cover portion 36a covers the mounting structure portions of the supporting devices 34 and the monitor unit 31 from the front surface side so that they will not be seen through a gap tf which is open on the lower side of the headrest 20. The cross-sectional shape of this cover portion 36a is set in a shape in which it is bent toward the front side of the vehicle in a chevron shape. Specifically, the bending point of the chevron shape of the cover portion 36a is set at the height wise position of the hinge portions 34a which constitute the rotational center of the monitor unit 31. As a result, the cover portion 36a has an avoiding shape for accepting the axial rotation of the monitor unit 31.

As shown in FIG. 5, the front cover 36 having the above-described configuration is capable of restricting the rotation of the monitor unit 31 about the hinge portions 34a within a fixed range by being assembled to the monitor cover 32 and the lower cover 33. Namely, as shown in FIG. 10, if the monitor unit 31 in the above-described assembled state is rotated either one direction, the reverse surface (front surface) of the monitor cover 32 which rotates integrally with the monitor unit 31 abuts (not shown) against the reverse surface (rear surface) of the front cover 36. As a result, the rotation of the monitor unit 31 is restrained.

Accordingly, as shown in FIG. 11, the monitor unit 31 in a state before the assembly of the front cover 36 thereto can be rotated freely about the hinge portions 34a. Accordingly, as indicated by the imaginary lines in the drawing, in the state in which the headrest 20 is removed from the seatback 10, the monitor unit 31 can be rotated and can be reclined toward the upper surface of the seatback 10 so as to be set in a folded-down attitude state. Accordingly, when, for example, the seat 1 is carried into the vehicle compartment, the seat 1 can be set in a compact form for facilitating the carrying of the seat 1 into the vehicle compartment by folding down the monitor unit 31 in advance in the above-described manner.

Incidentally, as shown in FIG. 3, vertically penetrating through holes 36b are formed at two left and right locations of the front cover 36 near its front side. These through holes 36b are adapted to allow the respective stays 22 and 23 of the headrest 20 to be inserted therein from the upper side when the headrest 20 is installed on the seatback 10. Accordingly, by inserting the stays 22 and 23 into these through holes 36b and then inserting them into the supports 40 and 50, the front cover 36 can be set like a pedestal and the headrest 20 can be installed on its upper side. Further, by installing the headrest 20 in this manner, the monitor unit 31 can be slid from below and fitted in the fitting recess 21a (for details see FIG. 4) formed in the reverse surface portion of the headrest 20. As a result, the headrest 20 and the monitor unit 31 can be assembled into a compact form which imparts a sense of unity. In addition, by virtue of the adoption of the above-described configuration, the monitor unit 31 can be configured to be separately independent so as not to follow the vertical movement of the headrest 20. Therefore, it is unnecessary to cause the wiring of the monitor unit 31 to follow the movement via, for instance, the interior of the stay 22 or the stay 23, and it is possible to simplify the wiring in the interior of the seatback 10.

Here, as shown in FIG. 3, the release button 36c is formed on the above-described front cover 36 at a lower position of its left side portion (side portion at right on this side in the plane of the drawing). As can be appreciated by referring to FIG. 5, in the state in which the front cover 36 is assembled to the monitor unit 31 and is installed on the seatback 10, this release button 36c is disposed at a position outside the operation knob 43 of the support 40. It should be noted that, in FIG. 5, to illustrate the above-described configuration in an easy-to-understand manner, the overall assembly structures of the monitor unit 31 are illustrated in a state in which they are lifted higher than the original position of the installed height. Accordingly, in actuality, the assembly structures of the monitor unit 31 are located on a lower side than in the illustrated state in FIG. 5, and there lease button 36c is disposed at a position immediately outside the operation knob 43.

The aforementioned release button 36c is adapted to allow the pushing operation of the operation knob 43 to be effected by its pushing operation. Namely, the pushing operation of the operation knob 43 can be performed from the position on the left outer side of the front cover 36.

Subsequently, a description will be given of the method of use in accordance with this embodiment.

First, as an initial state, the monitor unit 31 is hinge-coupled to the seatback 10 by means of the supporting devices 34, as shown in FIG. 11. In this state, the monitor cover 32 and the lower cover 33 are mounted to the monitor unit 31, and the front cover 36 is in a pre-mounting state. The headrest 20 is set in a state of being removed from the seatback 10. Accordingly, in this state, the monitor unit 31 can be reclined about the hinge portions 34a toward the upper surface of the seatback 10 so as to be set in a folded-down attitude state, as indicated by the imaginary lines in FIG. 11. As a result, the seat 1 can be carried into the vehicle compartment after being set in a compact attitude state.

Next, as indicated by the solid lines in FIG. 11, the monitor unit 31 is returned to its state of the upright attitude. Then, as shown in FIG. 5, the front cover 36 is assembled by being fitted from the reverse surface 31b side (front surface side) of the monitor unit 31. In this state in which the front cover 36 is assembled, the monitor unit 31 can be rotated only in a fixed range, as shown in FIG. 10. As a result, the display screen 31a (see FIG. 1) of the monitor unit 31 facing the rear seat (not shown) can be made to undergo swinging motion in the back-and-forth direction, thereby making it possible to perform the adjustment of the angle of its inclination.

Next, returning to FIG. 3, the stays 22 and 23 assembled to the headrest 20 are inserted into the supports 40 and 50 of the back frame 11. At this time, after the stays 22 and 23 are inserted in the through holes 36b of the front cover, the stays 22 and 23 are inserted into the respective supports 40 and 50. As a result, as shown in FIG. 1, the headrest 20 and the monitor unit 31 are assembled into a compact form which imparts a sense of unity. In addition, in this state, as shown in FIG. 6, the head receiving surface constituting the front surface of the head receiving portion 21 of the headrest 20 can be made to undergo swinging motion about the hinge portions 34a in the back-and-forth direction. As a result, the head receiving portion 21 can be moved between the close position indicated by the solid lines in the drawing and the spaced-apart position indicated by the imaginary lines, thereby making it possible to perform the adjustment of the back-and-forth position with respect to the seatback 10.

It should be noted that when the headrest 20 is removed from the seatback 10, it suffices if the headrest 20 is pulled upward while the pushing operation of the release button 36c disposed on its left position is being performed. As a result, the headrest 20 can be removed simply from the seatback 10.

Thus, according to the vehicle seat with a monitor in accordance with this embodiment, the swinging width in the back-and-forth movement of the head receiving portion 21 can be absorbed by the depth of the fitting recess 21a of the head receiving portion 21, so that it is possible to reduce the back-and-forth width in the configuration in which the headrest 20 and the monitor unit 31 are combined. Accordingly, even in the configuration in which the monitor unit 31 is assembled to the headrest 20, the adjustment of the back-and-forth position of the headrest 20 with respect to the seatback 10 can be performed in a compact form. Further, since the mounting structure portions of the head receiving portion 21 and the stays 22 and 23 are covered by the rear cover 26, it is possible to ensure that the appearance of the reverse surface side of the headrest 20 is not impaired, and the swinging motion of the headrest 20 can be effected smoothly. Furthermore, since the mounting structure portions of the monitor unit 31 and the seatback 10 are covered by the front cover 36, it is possible to ensure that the appearance of the front surface side of the monitor unit 31 which is seen through the gap tf between the headrest 20 and the seatback 10 is not impaired, and the swinging motion of the headrest 20 can be effected smoothly. Still further, by virtue of the hinge portions 34a it is possible to provide a simple structure in which the mechanism of adjusting the angle of inclination of the display screen 31a of the monitor unit 31 and the mechanism of reclining the monitor unit 31 toward the upper surface of the seatback 10 are combined. Further, by virtue of the side surface portions 21b of the head receiving portion 21, it is possible to cover lateral gaps formed between the head receiving portion 21 and the monitor unit 31 and ensure that the appearance will not be impaired.

EMBODIMENT 2

Figure 14:
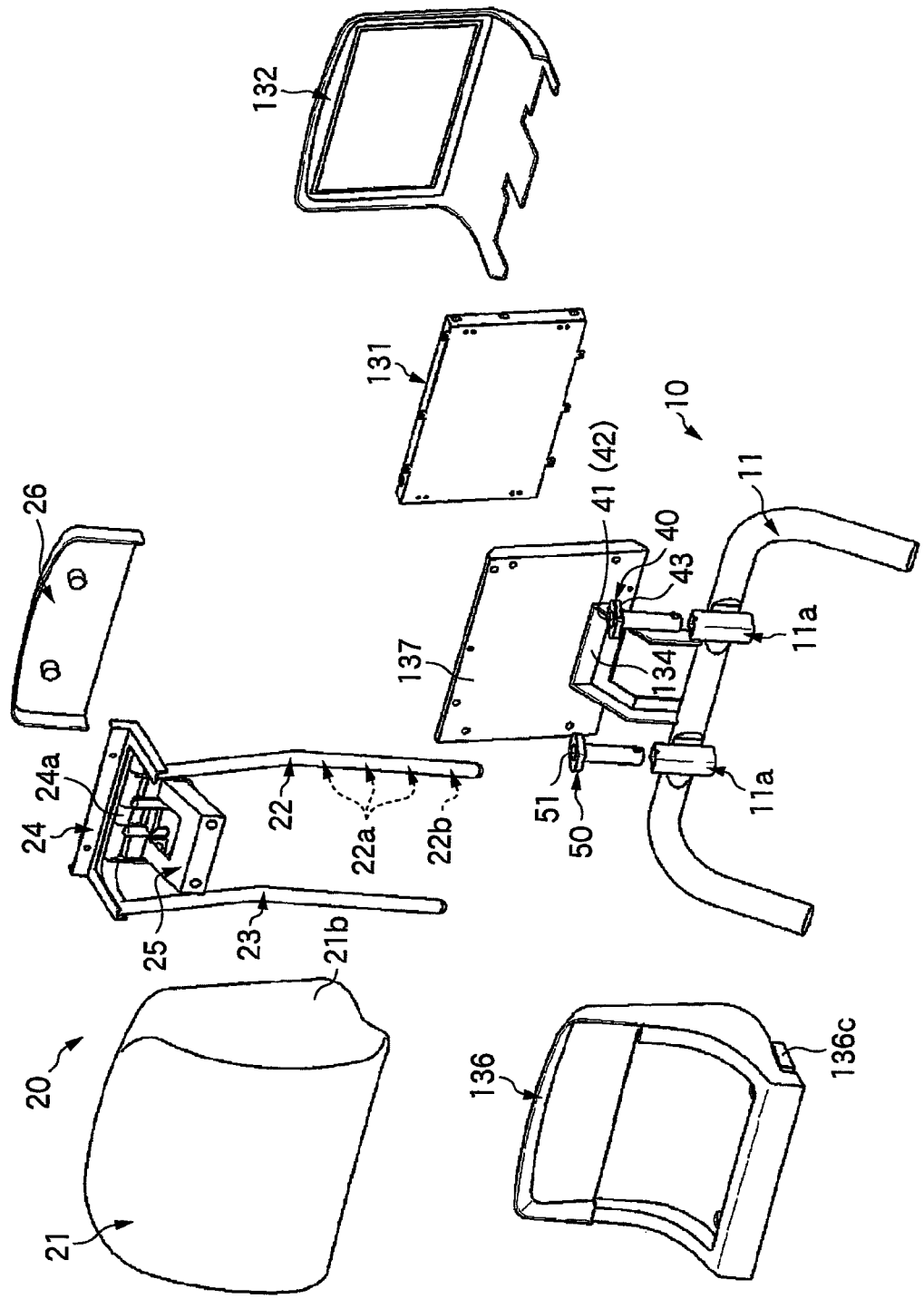
FIG. 14 is an exploded perspective view of a mounting structure of the headrest and a monitor unit of the vehicle seat with a monitor in accordance with embodiment 2.

Next, referring to FIG. 14, a description will be given of the configuration of the vehicle seat with a monitor in accordance with embodiment 2. FIG. 14 is an exploded perspective view of a mounting structure of the headrest 20 and a monitor unit 131 of the vehicle seat with a monitor.

In this embodiment, the monitor unit 131 is adapted to be rigidly fixed to a supporting device 134 fixed to the back frame 11 of the seatback 10. Specifically, a mounting base plate 137 is rigidly fixed to the supporting device 134, and the monitor unit 131 is adapted to be mounted thereto. Namely, the monitor unit 131 is configured so as not to rotate in the manner shown in embodiment 1.

Accordingly, in connection with this, a monitor cover 132 is so shaped that although the configuration in which the monitor cover 132 is integrally assembled to the outer frame of the monitor unit 131 so as to cover it is the same, the monitor cover 132 is integrally assembled to a front cover 136 as well. It should be noted that the configuration of a release button 136c provided on the front cover 136 is substantially the same as that of the release button 36c shown in embodiment 1.

Thus, the monitor unit 131 can also be configured to be rigidly fixed to the back frame 11. In addition, if a comparison is made with the configuration described in embodiment 1, this makes it possible to simplify the respective cover structures mounted to the monitor unit 131.

Although the mode of carrying out the invention has been described above through embodiments, the invention can be carried out in various forms other than the above-described embodiments.

For example, the hinge portion for reclining the monitor unit toward the upper surface of the seatback and the hinge portion for adjusting the angle of inclination of the display screen, which are shown in embodiment 1, maybe set in different portions. In addition, the release button may not necessarily be formed on the front cover, and may be formed on another component member such as a monitor cover. In addition, a hole allowing a finger to reach the operation knob may only be formed without setting the release button.

In addition, the cover portion of the front cover shown in embodiment 1 may not be structured to fully cover the mounting structure portions of the monitor unit. Namely, the cover portion is sufficient is it is capable of covering over the mounting structure portions of the monitor unit so that they will not be seen through the gap which is open on the lower side of the headrest. Accordingly, the cover portion may also be configured by being formed into such a shape (such as the shape of the cover portion 136 shown in FIG. 11) that only a lower region portion of the configuration shown in embodiment 1 is left and an upper region portion thereof is removed, so as to perform the covering function only by this lower region portion. By so doing, it becomes possible to accept the swinging motion of the monitor unit by the portion of the removed upper region portion, thereby making it possible to reduce the back-and-forth width of the configuration combining the headrest and the monitor unit.

The invention claimed is:

1. A vehicle seat with a monitor, comprising:
    a seatback;
    a headrest including:
        a head receiving portion receiving a back of a head of a vehicle occupant;
        a hollow recess being formed on a reverse side of the head receiving portion, the headrest being disposed such that a monitor unit at least partly enters the hollow recess;
        a stay mounting to the seatback, the stay being detachably attached to the headrest; and
        an actuating mechanism capable of moving back and forth the head receiving portion relatively with respect to the seatback, the actuating mechanism being provided at a connecting portion between the stay of the headrest and the head receiving portion; and
    the monitor unit including the monitor, the monitor unit being installed above the seatback and in a rear of the headrest,
    wherein the headrest and the monitor unit are respectively supported and disposed independently and separately on an upper surface portion of the seatback, both being fitted to each other relatively movably,
    wherein the actuating mechanism is adapted to relatively move the head receiving portion with respect to the stay between a close position in which the head receiving portion is brought close to a reverse portion of the monitor unit and a spaced-apart position in which the head receiving portion is forwardly moved to be spaced apart from the close position,
    wherein the head receiving portion is adapted to accept the relative approaching movement of the monitor unit by a recessed shape of the hollow recess, and
    wherein the monitor unit is at least partly accommodated in the recess regardless of the movement of the headrest.

2. The vehicle seat with a monitor according to claim 1, wherein the actuating mechanism is a hinge portion for hinge-coupling the head receiving portion of the headrest and the stay, and
    wherein the head receiving portion serving as a front surface of the head receiving portion is adapted to be made to undergo swinging motion about the hinge portion in a back-and-forth direction.

3. The vehicle seat with a monitor according to claim 2, wherein a curved portion having a curved shape for allowing the swinging motion of the headrest is provided in an upper portion of the monitor unit.

4. The vehicle seat with a monitor according to claim 1, wherein an insertion and coupling structure between the stay of the headrest and the seatback has a structure in which, as the stay is inserted into an interior of an insertion port formed in an upper surface of the seatback, an adjustment groove formed in the stay is retained by a retaining pawl provided in the interior of the insertion port in such a manner as to be capable of projecting into and retracting from the interior of the insertion port, so as to restrict the movement of the stay in an inserting direction;
    wherein a plurality of adjustment grooves are formed in an inserting and drawing-out direction as the adjustment groove so as to allow adjustment of a position of an installed height of the headrest to be performed by the selection of the adjustment groove for being retained by the retaining pawl; and
    wherein a rear cover is mounted to a reverse surface portion of the head receiving portion so as to cover from a reverse surface side mounting structure portions of the head receiving portion and the stay which are exposed on an upper side of the monitor unit when the installed height of the headrest is raised.

5. The vehicle seat with a monitor according to claim 4, wherein the rear cover is fixed to a side of the stay.

6. The vehicle seat with a monitor according to claim 4, wherein a front cover for covering from a front surface side mounting structure portions of the monitor unit and the seatback is mounted to the monitor unit, and
    wherein the front cover assumes a state of covering the structure portions which are seen through a gap from a front side which is formed between the headrest and the seatback when the installed height of the headrest is raised.

7. The vehicle seat with a monitor according to claim 1, wherein the monitor unit is hinge-coupled to the seatback and has a display screen adapted to be made to undergo swinging motion in the back-and-forth direction about the hinge portion which hinge-coupled.

8. The vehicle seat with a monitor according to claim 7, wherein in a state in which the headrest is removed from the seatback, the monitor unit is adapted to be folded down by being reclined about the hinge portion toward the upper surface of the seatback.

9. The vehicle seat with a monitor according to claim 1, wherein side surface portions constituting surface portions on both left and right sides of the recess are respectively formed in the head receiving portion of the headrest, and the side surface portions are configured in a state of covering lateral gaps formed between the head receiving portion and the monitor unit at either moved position to which the head receiving portion has been moved back and forth.

* * * * *